(12) United States Patent
Stroud et al.

(10) Patent No.: US 11,014,226 B2
(45) Date of Patent: May 25, 2021

(54) AUTOMATED PICK AND PLACE APPARATUSES WITH OBJECT ALIGNMENT SYSTEMS

(71) Applicant: Toyota Motor Engineering & Manufacturing North America, Inc., Plano, TX (US)

(72) Inventors: Eric L. Stroud, Gallipolis Ferry, WV (US); David W. Newberry, Gallipolis, OH (US); Charles K. Hibner, Jr., Ona, WV (US); Lisa M. Lovejoy, Ona, WV (US); Kathy Lester, Gallipolis, OH (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 385 days.

(21) Appl. No.: 16/172,052

(22) Filed: Oct. 26, 2018

(65) Prior Publication Data

US 2020/0130171 A1    Apr. 30, 2020

(51) Int. Cl.
*B25J 9/00* (2006.01)
*B25J 9/16* (2006.01)

(52) U.S. Cl.
CPC ........... *B25J 9/0096* (2013.01); *B25J 9/1612* (2013.01); *B25J 9/1669* (2013.01); *B25J 9/1697* (2013.01)

(58) Field of Classification Search
CPC ...... B25J 9/0096; B25J 9/1669; B25J 9/1697; B25J 9/1612; B25J 9/1679; B25J 19/023; B25J 13/086; B25J 15/009; G05B 2219/40053; G05B 2219/45063

USPC .................................................. 700/245–264
See application file for complete search history.

(56) References Cited

U.S. PATENT DOCUMENTS

| | | | | |
|---|---|---|---|---|
| 3,327,386 A | * | 6/1967 | Jerue | B23Q 3/1554 483/34 |
| 4,826,781 A | * | 5/1989 | Asahina | H01L 21/3086 257/624 |
| 4,898,416 A | | 2/1990 | Hubbard et al. | |
| 5,090,758 A | * | 2/1992 | Lord | B25J 15/0023 294/119.3 |
| 5,477,309 A | * | 12/1995 | Ota | G03F 9/70 355/53 |

(Continued)

FOREIGN PATENT DOCUMENTS

| | | |
|---|---|---|
| CN | 105583824 | 5/2017 |
| CN | 106737808 | 5/2017 |

(Continued)

*Primary Examiner* — Jaime Figueroa
(74) *Attorney, Agent, or Firm* — Dinsmore & Shohl LLP

(57) ABSTRACT

An automated pick and place apparatus includes a robotic arm having at least three degrees of freedom. An end effector is mounted to the robotic arm and includes a gripping device for gripping a target object. An actuator actuates the gripping device. An object alignment device is mounted to the robotic arm. The object alignment device includes a body having a base and an end face opposite the base. An alignment projection is slidingly received by the body within an opening and extending outwardly beyond the end face. The alignment projection has an extended configuration and a retracted configuration. A sensor detects when the alignment projection is in the retracted configuration and provides a signal to a processor.

14 Claims, 5 Drawing Sheets

(56) References Cited

U.S. PATENT DOCUMENTS

| | | | | |
|---|---|---|---|---|
| 6,085,407 A | * | 7/2000 | Gamel | H05K 3/303 |
| | | | | 29/712 |
| 6,589,789 B1 | * | 7/2003 | Hubert | G01N 35/0099 |
| | | | | 422/504 |
| 8,686,869 B2 | * | 4/2014 | Sharma | G01D 5/268 |
| | | | | 340/686.2 |
| 9,505,135 B1 | | 11/2016 | Malstrom et al. | |
| 2002/0198610 A1 | * | 12/2002 | Malin | H01L 21/681 |
| | | | | 700/59 |
| 2005/0134299 A1 | * | 6/2005 | Cram | G01R 31/2863 |
| | | | | 324/750.05 |
| 2009/0116940 A1 | * | 5/2009 | Burke | B65G 47/92 |
| | | | | 414/225.01 |
| 2011/0209320 A1 | * | 9/2011 | Connolly | B23Q 17/2414 |
| | | | | 29/407.04 |
| 2011/0228080 A1 | * | 9/2011 | Ding | H04N 7/18 |
| | | | | 348/135 |
| 2012/0167646 A1 | * | 7/2012 | Sharma | G01D 5/268 |
| | | | | 70/280 |
| 2014/0270473 A1 | * | 9/2014 | Youngquist | H05K 13/085 |
| | | | | 382/147 |
| 2014/0277680 A1 | * | 9/2014 | Youngquist | B23K 1/0016 |
| | | | | 700/121 |

FOREIGN PATENT DOCUMENTS

| | | |
|---|---|---|
| CN | 206923314 | 1/2018 |
| CN | 207522621 | 6/2018 |

\* cited by examiner

AUTOMATED PICK AND PLACE APPARATUSES WITH OBJECT ALIGNMENT SYSTEMS

TECHNICAL FIELD

The present specification generally relates to automated pick and place apparatuses, and more specifically, automated pick and place apparatuses with object alignment systems.

BACKGROUND

A number of automated pick and place apparatuses (industrial robots) are available for picking target objects, for example, from a bin or other location and placing the objects at a different, preselected location. The automated pick and place apparatuses may rely on some form of part identifying technology, such as a camera, to identify the target object to be picked. However, these cameras may provide limited information regarding position and alignment, particularly as the pick and place apparatuses move toward the target object during the picking operation. Misalignment with the target object as the automated pick and place apparatuses engages the target object can result unintended contact with the target object.

Accordingly, a need exists for an automated pick and place apparatus with an object alignment system that can provide the automated pick and place apparatuses more reliable alignment with a target object before the target object is engaged during a picking operation.

SUMMARY

In one embodiment, an automated pick and place apparatus includes a robotic arm having at least three degrees of freedom. An end effector is mounted to the robotic arm and includes a gripping device for gripping a target object. An actuator actuates the gripping device. An object alignment device is mounted to the robotic arm. The object alignment device includes a body having a base and an end face opposite the base. An alignment projection is slidingly received by the body within an opening and extending outwardly beyond the end face. The alignment projection has an extended configuration and a retracted configuration. A sensor detects when the alignment projection is in the retracted configuration and provides a signal to a processor.

In another embodiment, a method of picking a target object using an automated pick and place apparatus is provided. The method includes moving an object alignment device toward a target object using a robotic arm of the automated pick and place apparatus. The object alignment device includes a body having a base and an end face opposite the base. An alignment projection slidingly received by the body within an opening and extending outwardly beyond the end face. The alignment projection has an extended configuration and a retracted configuration. A sensor detects when the alignment projection is in the retracted configuration and provides a signal to a processor. The target object is engaged with the alignment projection such that the alignment projection moves to the retracted configuration. The processor detects a misalignment configuration using the signal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Automated pick and place apparatuses, as described in the present specification include object alignment systems that are used to align an end effector of the automated pick and place apparatuses with a target object to be picked as the end effector is moved into place relative to the target object during the picking operation. The object alignment systems may include an imaging sensor, such as a camera, that is used to initially identify the target object and the orientation and position of the target object. However, many imaging sensors provide information in two dimensions which, alone, may be inadequate to provide enough information to repeatably engage multiple target objects in a reliable fashion due, at least in part, to packaging and part position tolerances. To this end, the object alignment systems are provided with an object alignment device. The object alignment device includes a body that houses the camera and a pair of alignment projections that are movably mounted to the body. The alignment projections are sized and arranged to be received within corresponding openings of the target object. In a misalignment condition, the alignment projections may contact the target object and deflect, which is detected by a sensor that provides a signal indicative of the misalignment condition. In an alignment condition, the alignment projections are received within the openings of the target object and are not deflected such that the sensor does not provide the signal indicative of the misalignment condition.

Figure 1:
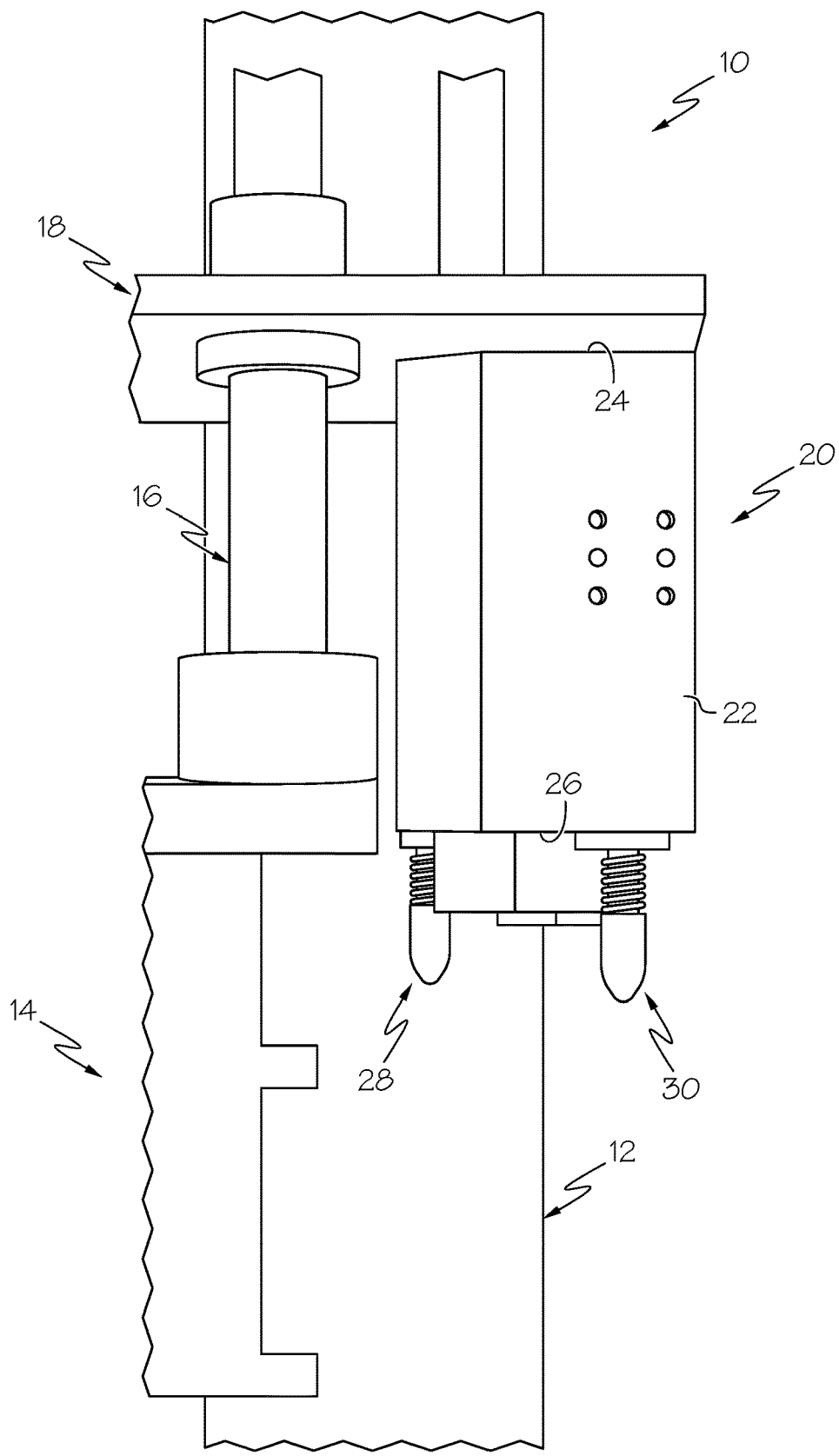
FIG. 1 illustrates a front view of an automated pick and place apparatus including an object alignment device, according to one or more embodiments shown and described herein.

Referring to FIG. 1, an automated pick and place apparatus 10 includes a robotic arm 12 that is connected to an end effector 14. The robotic arm 12 may have any number of degrees of freedom suitable for a particular pick operation, such as six degrees of freedom or less, such as five degrees of freedom or less, such as four degrees of freedom or less, such as three degrees of freedom. In the illustrated embodiment, the end effector 14 is a gripping device (e.g., a clamp)

that is used to clamp a side of a target object, such as an automobile part for assembly.

The end effector 14 is manipulated by an actuator 16 between open and closed configurations. The actuator 16 may be any suitable actuator, such as pneumatic, hydraulic, motor-driven, etc. The end effector 14 is supported by a support structure 18. An object alignment device 20 is mounted to the support structure 18 adjacent to the end effector 14. The object alignment device 20 generally includes a body 22 having a base 24 that is mounted to the support structure 18 and an end face 26 that is opposite the base 24. The end face 26 is the portion of the body 22 that interfaces with a target object during a picking operation. Extending outwardly from the face are alignment projections 28 and 30.

Figure 2:
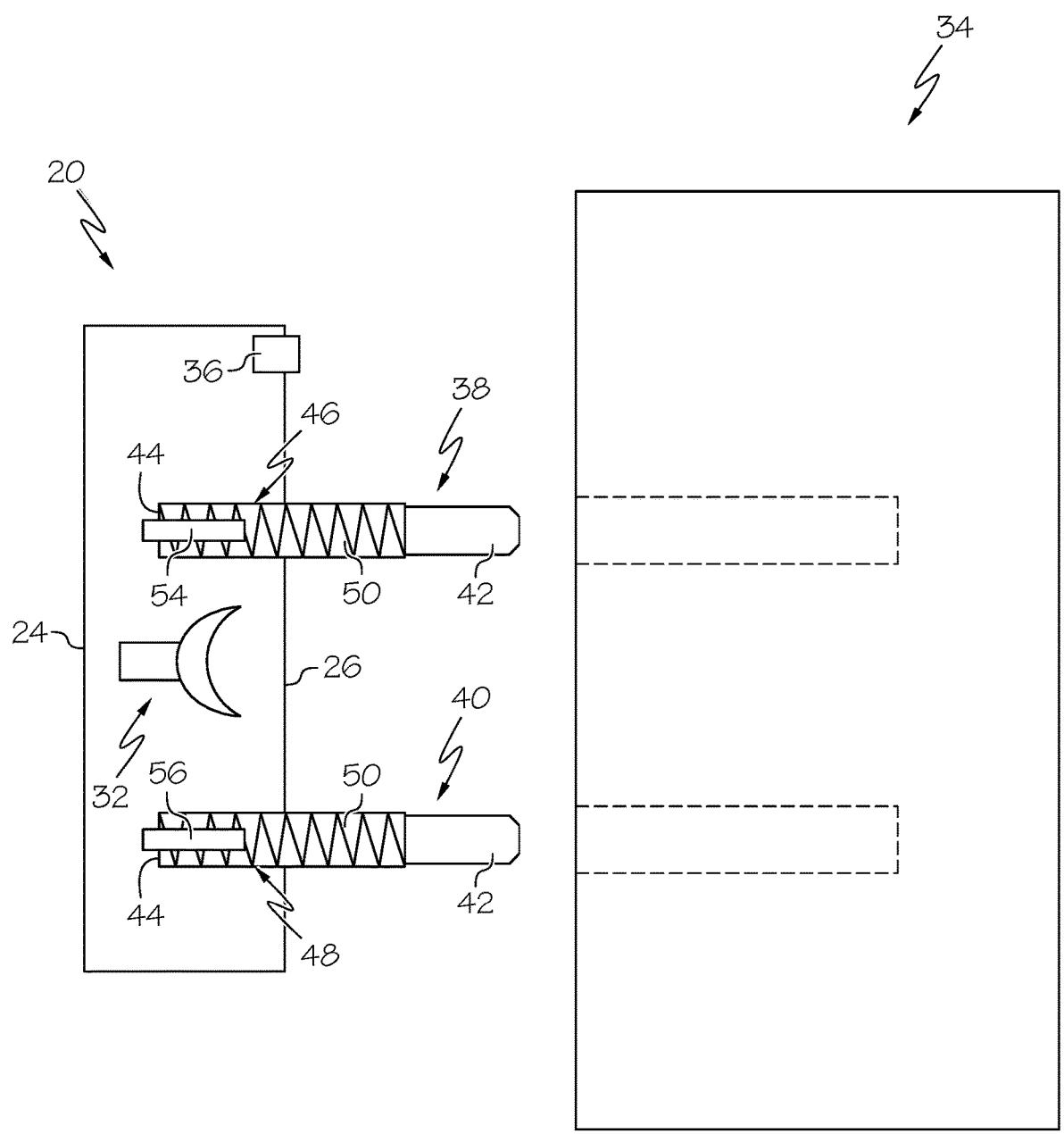
FIG. 2 is a diagrammatic illustration of the object alignment device of FIG. 1, according to one or more embodiments shown and described herein.

Referring to FIG. 2, the object alignment device 20 is illustrated diagrammatically and in isolation. The object alignment device 20 includes the body 22 that can house a camera 32 or other suitable sensor. The camera 32 is used to take an initial image of a target object 34. The object alignment device 20 further includes an object detection sensor 36, such as a proximity sensor, that is used to detect presence of the target object 34. The alignment projections 38 and 40 extend outwardly from the end face 26. Each alignment projection 28 and 30 has a distal end 42 and a proximal end 44. The proximal ends 44 are received within openings 46 and 48 that extend into the body 22 from the end face 26. The distal ends 42 may be moveable relative to the proximal ends 44. In the illustrated embodiment, the distal ends 42 are biased by springs 50 toward an extended position, as illustrated by FIG. 2. The object alignment device 20 further includes alignment projection detection sensors 54 and 56 that detect position or presence of the distal ends 42 of the alignment projections 28 and 30.

Figure 3:
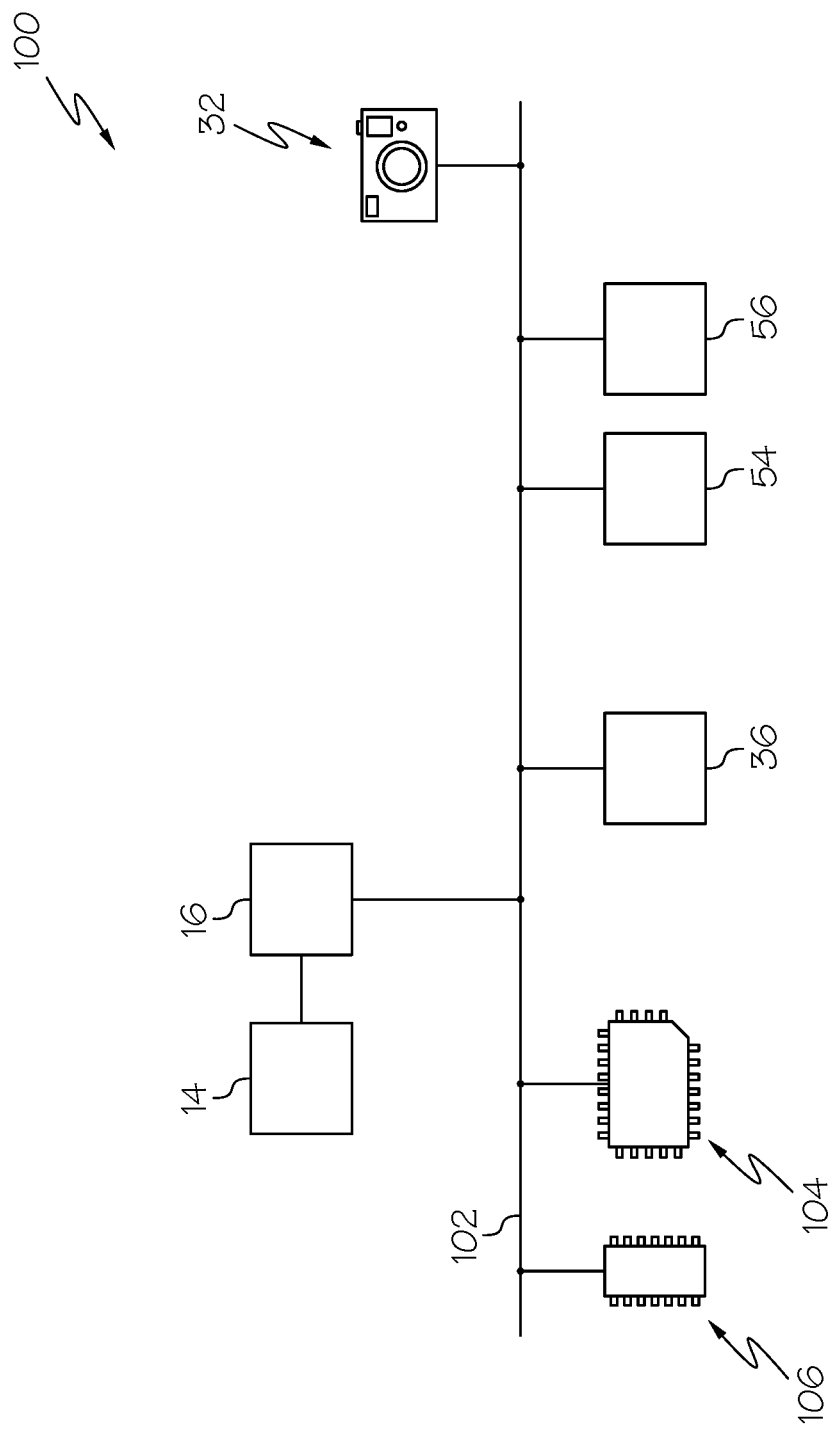
FIG. 3 is a schematic illustration of an object alignment system for the automated pick and place apparatus of FIG. 1, according to one or more embodiments shown and described herein.

Referring to FIG. 3, the object alignment device 20 is part of an object alignment system 100 that aligns the end effector 14 with the target object 34 for a picking operation. In FIG. 3, object alignment system 100 is illustrated schematically. The object alignment system 100 includes a communication path 102, a processor 104, a memory module 106, the camera 32, the alignment projection detection sensors 54 and 56 and the object detection sensor 36. The actuator 16 and end effector 14 are also provided. The object alignment system 100 may be part of an industrial robot arm control system that is used to control operation and movement of the automated pick and place apparatus 10.

The object alignment system 100 includes the communication path 102 that provides data interconnectivity between various modules disposed within the object alignment system 100. Specifically, each of the modules can operate as a node that may send and/or receive data. In some embodiments, the communication path 102 includes a conductive material that permits the transmission of electrical data signals to processors, memories, sensors, and actuators throughout the object alignment system 100. Components that are communicatively coupled may include components capable of exchanging data signals with one another such as, for example, electrical signals via conductive medium, electromagnetic signals via air, optical signals via optical waveguides, and the like.

The object alignment system 100 includes the processor 104 communicatively coupled with the memory module 106 over the communication path 102. The processor 104 may include any device capable of executing machine-readable instructions stored on a non-transitory computer-readable medium. The processor 104 may include one or more processors. Accordingly, each processor 104 may include a controller, an integrated circuit, a microchip, a computer, and/or any other computing device.

The memory module 106 is communicatively coupled to the processor 104 over the communication path 102. The memory module 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the object alignment system 100 and/or external to the object alignment system 100. The memory module 106 may be configured to store one or more pieces of logic. The memory module 106 may include one or more memory modules. The embodiments described herein may utilize a distributed computing arrangement to perform any portion of the logic described herein.

Embodiments of the present disclosure include logic stored on the memory module 106 that includes machine-readable instructions and/or an algorithm written in any programming language of any generation (e.g., 1GL, 2GL, 3GL, 4GL, and/or 5GL) such as, machine language that may be directly executed by the processor 104, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

The object alignment system 100 further includes the actuator 16. The actuator 16 may include one or more actuators that can be used to actuate the end effector 14. The actuator 16 can be coupled to the communication path 102 and communicatively coupled to the processor 104 to control operation (e.g., opening and closing) of the end effector 14. The object detection sensor 36 is coupled to the communication path 102 and detects presence of the target object 34 when the object alignment device 20 is properly aligned with the target object 34. The alignment projection detection sensors 54, 56 are also coupled to the communication path 102 and provide a signal when the distal ends 42 of the alignment projections 38 and 40 are detected. The camera 32 is connected to the communication path 102 and provides an image of the target object 34.

Figure 4:
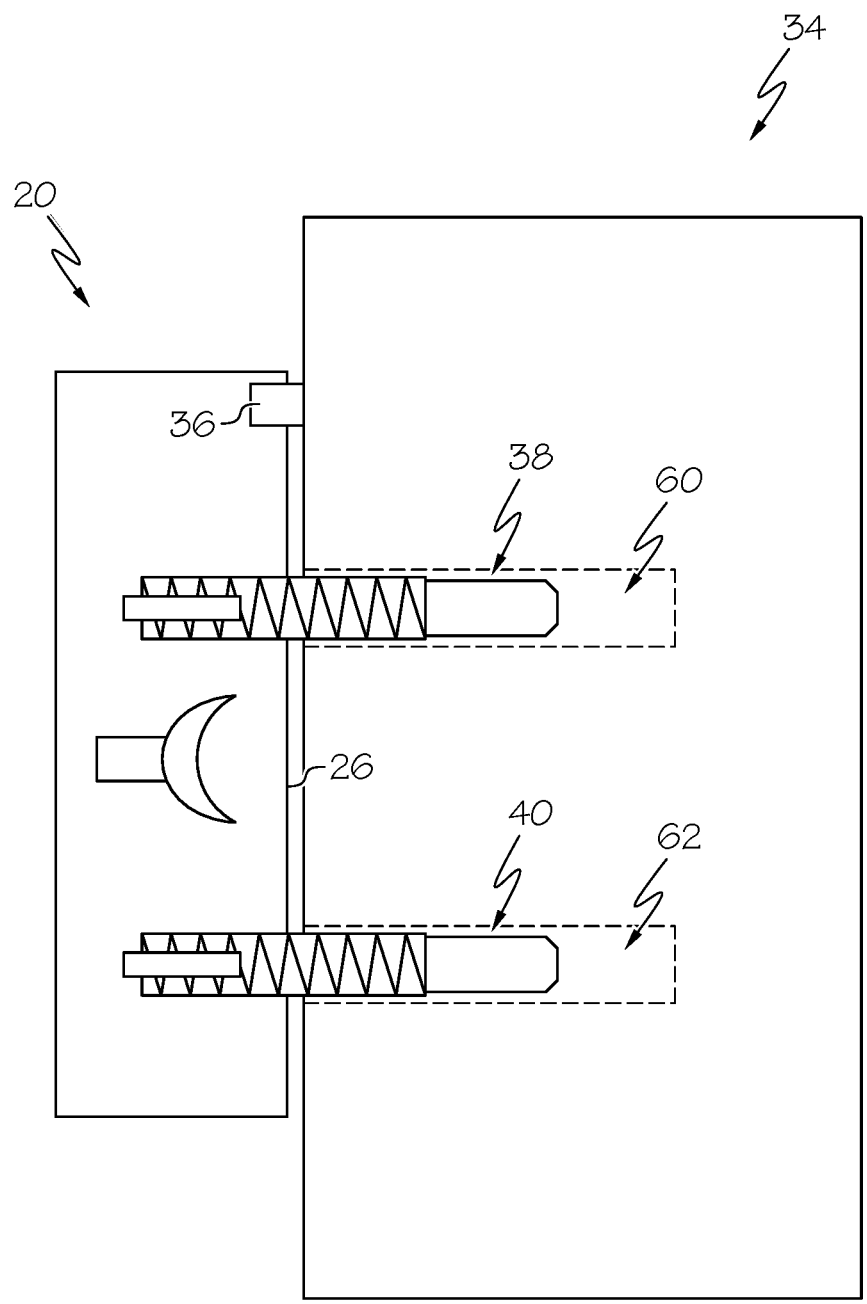
FIG. 4 is a diagrammatic illustration of the object alignment device of FIG. 2 in an aligned configuration, according to one or more embodiments shown and described herein.

In the example of FIG. 4, the object alignment device 20 is illustrated in an aligned configuration where the object alignment device 20 is aligned with the target object 34 (e.g., a crankcase stiffener). In the aligned configuration, the alignment projections 38 and 40 are received by openings 60 and 62 provided in the target object 34. The alignment projections 38 and 40 are sized to be received in the openings 60 and 62 in their extended configurations. As the end face 26 nears the target object 34, the object detection sensor 36 detects the presence of the target object 34 and provides a signal to the processor 104. In the absence of a signal from the alignment projection detection sensors 54, the processor 104 can determine that the object alignment device 20 is in the aligned configuration and the end effector 14 (FIG. 1) can be actuated to grip the target object 34.

Figure 5:
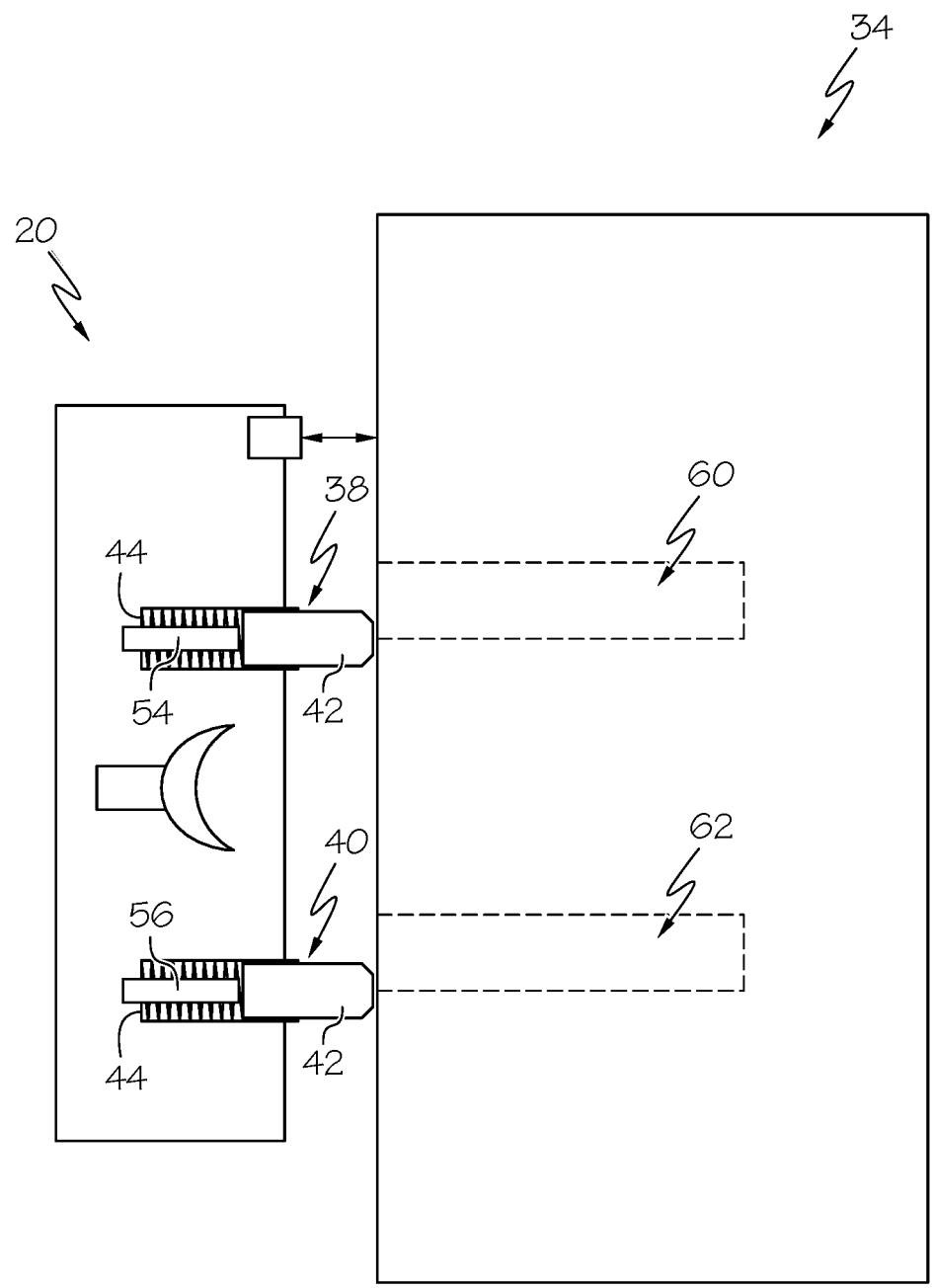
FIG. 5 is a diagrammatic illustration of the object alignment device of FIG. 2 in a misaligned configuration, according to one or more embodiments shown and described herein.

In the example of FIG. 5, the object alignment device 20 is illustrated in a misaligned configuration where the object alignment device 20 is misaligned with the target object 34. In the misaligned configuration, the alignment projections 38 and 40 engage the target object 34 outside the openings 60 and 62 thereby causing the distal ends 42 of the alignment projections 38 and 40 to deflect linearly toward the proximal ends 44 where the alignment projection detection sensors 54 are located. The alignment projection detection sensors 54, 56 then detect the presence of the distal ends 42 and provide a signal to the processor 104. In the absence of a signal from the object detection sensor 36, the processor can determine that the object alignment device 20 is in the misaligned configuration and the end effector 14 and object alignment device 20 can be moved away from the target object 34, for example, and move to a next target object to repeat the process.

The above-described object alignment devices and associated methods provide automated pick and place apparatuses with a way to determine whether or not an end effector is properly aligned with a target object before engaging the target object. The object alignment devices include spring biased alignment projections that deflect when misaligned with the target object to reduce an impact force on the target object when engaged therewith.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automated pick and place apparatus, comprising:
    a robotic arm having at least three degrees of freedom;
    an end effector mounted to the robotic arm comprising a gripping device for gripping a target object;
    an actuator that actuates the gripping device;
    an object alignment device mounted to the robotic arm, the object alignment device comprising:
        a body having a base and an end face opposite the base;
        an alignment projection slidingly received by the body within an opening and extending outwardly beyond the end face, the alignment projection having an extended configuration and a retracted configuration; and
        a sensor that detects when the alignment projection is in the retracted configuration and provides a signal to a processor.

2. The automated pick and place apparatus of claim 1, wherein the object alignment device further comprises an object detection sensor that sends a signal to the processor when a target object is detected.

3. The automated pick and place apparatus of claim 1, wherein the object alignment device comprises a second alignment projection slidingly received by the body within a second opening and extending outwardly beyond the end face, the second alignment projection having an extended and retracted configuration.

4. The automated pick and place apparatus of claim 3, wherein the object alignment device comprises a second sensor that detects when the second alignment projection is in the retracted configuration and provides a signal to the processor.

5. The automated pick and place apparatus of claim 1, wherein the alignment projection includes a proximal end and a distal end, the distal end being spring biased toward the extended configuration.

6. The automated pick and place apparatus of claim 5, wherein the distal end moves toward the proximal end in the retracted configuration.

7. The automated pick and place apparatus of claim 1, wherein the body houses a camera.

8. A method of picking a target object using an automated pick and place apparatus, the method comprising:
    moving an object alignment device toward a target object using a robotic arm of the automated pick and place apparatus, the object alignment device comprising:
        a body having a base and an end face opposite the base;
        an alignment projection slidingly received by the body within an opening and extending outwardly beyond the end face, the alignment projection having an extended configuration and a retracted configuration; and
        a sensor that detects when the alignment projection is in the retracted configuration and provides a signal to a processor;
    engaging the target object with the alignment projection such that the alignment projection moves to the retracted configuration; and
    the processor detecting a misalignment configuration using the signal.

9. The method of claim 8, wherein the object alignment device further comprises an object detection sensor that sends a signal to the processor when a target object is detected.

10. The method of claim 8, wherein the object alignment device comprises a second alignment projection slidingly received by the body within a second opening and extending outwardly beyond the end face, the second alignment projection having an extended and retracted configuration.

11. The method of claim 10, wherein the object alignment device comprises a second sensor that detects when the second alignment projection is in the retracted configuration and provides a signal to the processor.

12. The method of claim 8, wherein the alignment projection includes a proximal end and a distal end, the distal end being spring biased toward the extended configuration.

13. The method of claim 12, wherein the distal end moves toward the proximal end in the retracted configuration.

14. The method of claim 13, wherein the body houses a camera.

* * * * *